Inventors
Werner Knoll and Carl Hans Bidenberg

INVENTORS:
Werner Knoll and
Carl Hans Biedendieck
BY:
Michael S. Striker
agt

United States Patent Office 2,750,796
Patented June 19, 1956

2,750,796

APPARATUS FOR MEASURING VARIABLE CONDITIONS IN BORE-HOLES

Werner Knoll, Hamburg, and Carl Hans Biedendieck, Bentheim, Germany, assignors to H. Maihak Aktiengesellschaft, a German corporation Application May 31, 1951, Serial No. 229,062

Claims priority, application Germany June 9, 1950

7 Claims. (Cl. 73—152)

This invention relates to apparatus for measuring a variable condition, e. g. temperature or pressure, in bore-holes and is of especial value in connection with oil-wells.

Various methods are known for measuring the temperature and pressure of gas and liquid in wells such as petroleum oil-wells. The simplest method is to lower a recording pressure gauge and a recording thermometer into the well, the temperature and pressure being recorded on a paper record sheet. In such apparatus the record sheet is usually driven by a spring-actuated mechanism and when this runs down the instrument must be withdrawn from the well. It is not until this withdrawal is effected that the record can be seen. Moreover, during such withdrawal of the instruments the oil-conveying operations must be stopped. Since the driving mechanism only runs for a limited time, frequent withdrawals for re-setting the instruments are required. Furthermore the instruments are liable to become damaged by the mechanical strains imposed on them during the oil-conveying operation so that it frequently occurs that on withdrawal of the instruments it is found that no record has been effected due to breakdown of the instruments.

Moreover, in the pressure recording instruments hitherto employed, the pressure-responsive spring elements have frequently had very long paths of movement, or large mechanical transmission means for the movement of the spring elements has been required. This is unsatisfactory because frictional losses occur and cause very large errors in the measurements recorded.

For recording temperature variation continuously, which is sometimes desirable in conjunction with the recording of pressure variation, there is employed means whereby the variation of level of a mercury column is recorded on a record sheet and similar disadvantages arise in this method.

A pressure-measuring instrument for use in recording pressure at the bottom of wells has been described in which the measuring device, which is lowered into the well, contains a liquid and this is electrically heated by an electric supply via cables from the surface of the well. The liquid container is sealed off by a diaphragm having an electric contact and the arrangement is such that the vapour pressure set up by heating the liquid acts on the diaphragm in opposition to the oil or gas pressure in the well. The contact provided on the diaphragm closes an electric circuit which includes a resistance thermometer which measures the vapour temperature.

Other pressure and temperature measuring instruments for wells are known in which the pressure-sensitive or temperature-sensitive element is connected to an electric circuit by means of which the pressures, and temperatures to be measured are converted, at the measuring point, into electrical values and are transmitted as such through electrical cables to an electric indicating and recording instrument. Apart from the very disadvantageous inconstancy of the calibration values of such measuring methods, which convert the mechanical values measured into electrical values for the purpose of the measurement, a further disadvantage of such measuring arrangements lies in the necessity for cable connections between the measuring devices in the well and the indicating instrument on the surface.

Great disadvantages also exist in arrangements in which, in order to avoid such cable connections, a battery-fed electric transmitter is lowered into the well in addition to the actual measuring device, the said transmitter transmitting to the surface by wireless means electrical values proportional to the pressure and temperature. However, in addition to the defects existing in all electrical measuring methods, as mentioned above, the life of the current supply battery of the transmitter is limited. Moreover, such apparatus is liable to mechanical disturbance during the oil-conveying operation.

The serious disadvantages of the known methods and arrangements referred to above are such that they are only employed in isolated cases, although the continued checking of pressure and temperature is of great importance in the conveyance of oil from an oil-well.

It is an object of the present invention to provide a new apparatus for measuring continuously the gas and liquid pressure in a bore-hole and particularly an oil-well. A still further object of this invention is to provide an apparatus for measuring temperature and pressure whereby changes in temperature or pressure are converted to mechanical oscillations and such oscillations are converted to electrical oscillations and their frequency measured. Other objects of the invention will appear from the description hereinafter set forth.

According to the present invention, an apparatus for measuring a variable condition in a bore-hole, e. g. an oil-well, includes means for converting the variation in the bore-hole into mechanical oscillations, the frequency of which is dependent on the value of the variable, means for converting such mechanical oscillations into electrical oscillations, means for transmitting said electrical oscillations to the surface of the bore-hole and there measuring the frequency thereof.

The variation in frequency thus measured may be used to regulate the variable condition in the bore-hole. Thus the pressure in the bore-hole may be controlled by varying the delivery of a pump, e. g. by varying the cross-sectional area of its nozzle, in dependence on the measured frequency or the temperature in the bore-hole may be controlled by varying the temperature of a heating or cooling liquid introduced therein, in dependence on the measured frequency.

The invention is of primary significance where the variable is temperature or pressure, the measured frequency at the surface being proportional to the value of the temperature or pressure in the bore-hole. The essential characteristic of this invention is that the value of the variable is converted into a time value (frequency of oscillation) and may be measured by direct comparison with another adjustable oscillation; accordingly electrical variations such as conduction resistance and contact resistance do not falsify the measurement, the measurement being carried out on a time basis and not on an electrical basis.

Apparatus suitable for carrying out this invention consists essentially of a sub-surface unit or measuring instrument and a surface unit or receiving instrument. The measuring instrument is lowered into the well and is preferably rigidly connected to the rising side of the pump. The measuring instrument includes an element responsive to variations in the variable to be measured and this element is connected to a tensioned steel wire so that movement of the element will vary the tension of such wire. The natural frequency of oscillation of the steel wire depends on the tension and hence will vary as a function of the position of the element responsive to changes in the variable.

In a preferred embodiment of this invention adapted for use as an instrument for measuring pressure in a well, the apparatus consists of a housing having apertures, a spring element within the housing and adapted to be acted on by the variable pressure, preferably a diaphragm, and a steel wire, stretched as to be capable of oscillation, linked to the spring element. The square of the natural frequency of oscillation of the wire then varies proportionally to the pressure to be measured, in accordance with the momentary position of the spring element. One or more electromagnets are arranged before the wire to excite and convert the oscillations. The coil connections of the electromagnets are connected to a receiving instrument known per se on the surface, in which receiving instrument the frequency variations produced by the pressure fluctuations are determined either directly or with the aid of a second known variable oscillation.

When employed to measure the temperature in a well, the new instrument consists of a measuring member consisting of material whose coefficient of heat expansion differs from that of steel. Positively connected to the measuring member is a steel wire so tensioned as to be capable of oscillation. In this arrangement, temperature variations, by varying the measuring member and therefore the tension on the wire, have the effect of varying the natural frequency of oscillation of the tensioned wire, the magnitude of the variations being in accordance with the coefficient of heat expansion of the measuring member. The frequency of oscillation is determined in the manner described above, the square thereof being proportional to the temperature to be measured.

Either undamped or damped oscillations may be employed for the measurement. The connection between the actual measuring instrument and the receiver may be provided by cables. However, since a cable connection to the point of measurement in the well generally interferes with the oil-conveying operation, the preferred form of apparatus according to the present invention comprises connection to the surface by the rising pipe of the pump and/or the link system of the pump as one conductor, and by the external casing and/or the underground pipe line as the other conductor, one such conductor being insulated from the other.

The invention thus permits continuous frictionless measurement of the liquid or gas pressure or the liquid and gas temperature prevailing in the well, and transmission of the measurements to the surface, this being done in the preferred embodiment without introducing any electric connecting cable into the well.

A preferred form of apparatus according to the invention will now be described with reference to the accompanying drawings in which.

Figures 1, 2:
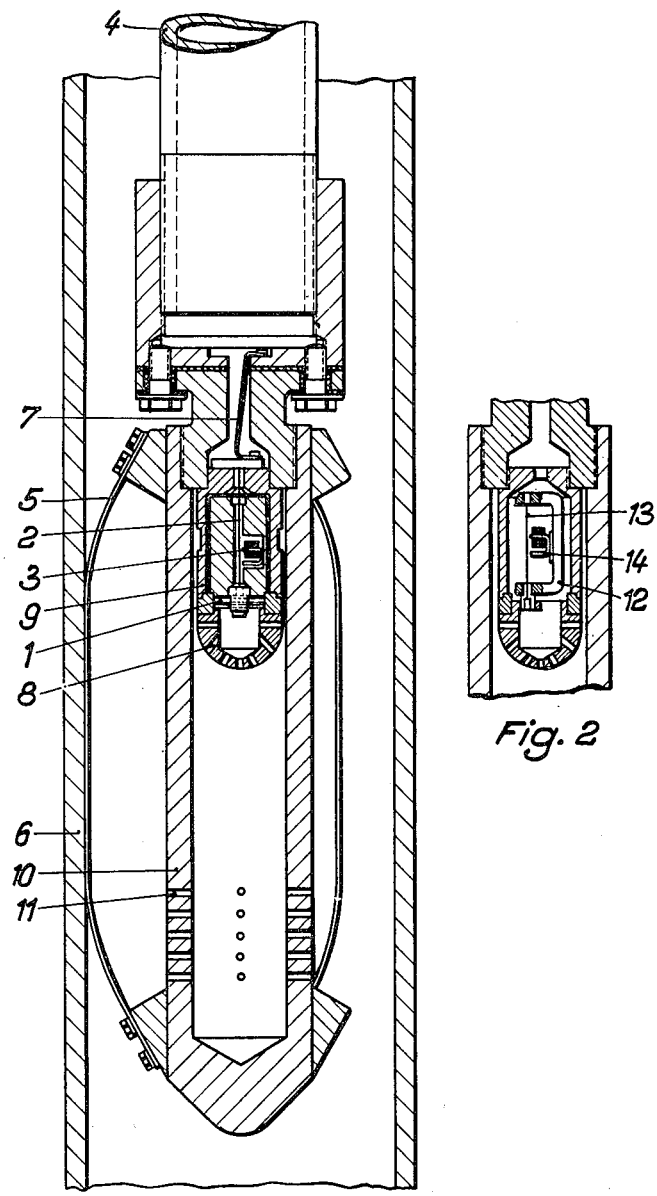
Figure 1 shows in diagrammatic elevational section a sub-surface unit or pressure-measuring instrument for an oil-well.
Figure 2 shows in diagrammatic section the construction of apparatus for temperature measurement.
Figure 4:
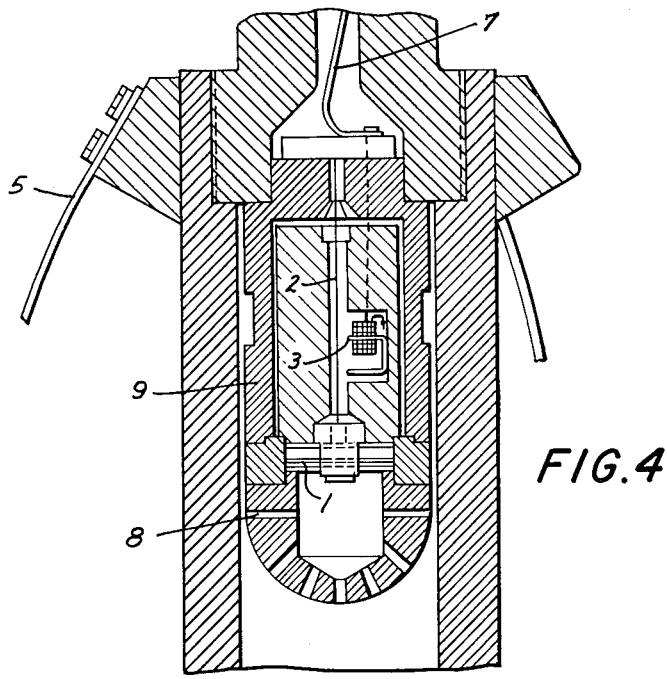
Fig. 4 is an enlarged view of a portion of Fig. 1.

In Figures 1 and 4, the pressure-responsive spring element is the diaphragm 1, which is arched under the momentarily prevailing gas and liquid pressure. In order to measure this momentary spring movement, there is linked to the diaphragm a steel wire 2 which is so tensioned as to be capable of oscillation. The natural frequency of oscillation of the wire varies in accordance with the momentary deflection of the diaphragm and therefore proportionally to the pressure to be measured. An electromagnet 3 is arranged before the wire 2 to excite and convert the oscillations. One coil end of the electromagnet 3 is electrically connected by a conductor 7 to the rising pipe 4 of the pump, while the other coil end is connected through the insulated contact springs 5 to the outer casing 6. The outer casing on the one hand and the rising pipe and link system of the pump on the other hand are electrically insulated from one another by intermediate layers of insulation. The diaphragm 1, the steel wire 2 and the electromagnet 3 are surrounded by a housing 9 in which perforations 8 are formed below the diaphragm. The housing 9 is fitted in a protective jacket 10 having perforations 11. The coil connections of the electromagnet 3, which are extended to the surface in the manner described, are electrically connected to a receiving instrument known per se in which the measurement is carried out, preferably by a comparison measuring method.

Figure 3:
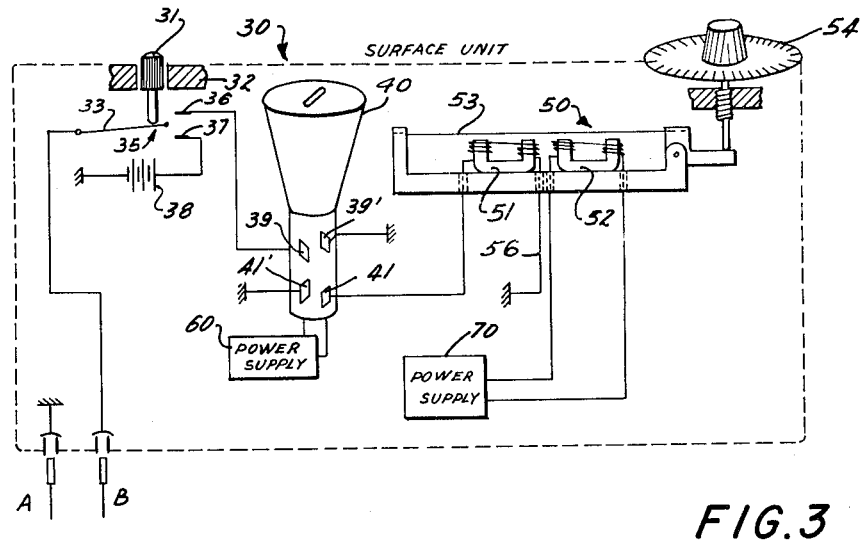
Fig. 3 is a diagrammatic electrical schematic of a surface unit or receiving instrument.

Referring now to Figure 3, a button 31 is shown mounted on the casing 32 of the surface unit 30. The casing 32 may be grounded but the button 31 is insulated therefrom. The button 31 engages a movable arm 33 of a single pole double throw switch 35 having fixed contacts 36 and 37.

The movable arm 33 is normally biased to make contact with the fixed contact 36. The spring biasing means for the switch 35 is not shown in order to avoid unnecessarily complicating the drawing. Therefore, the arm 33 normally maintains the button 31 in its outwardly projected position.

Connected to the fixed contact 37 of the switch 35 is one terminal of a direct current energizing source 38, the other terminal of which is connected to ground. The other fixed contact 36 of the switch 35 is connected to one plate 39 of a pair of deflecting plates of a cathode ray tube 40. The corresponding plate 39' of this pair is connected to ground. The surface unit also includes a frequency determining member 50 constructed substantially in accordance with the frequency determining instrument disclosed in Pabst et al. Patent No. 2,306,137, and includes an electromagnet 51 and an electromagnet 52, a tensioned steel wire 53 and calibrated means 54 for varying the tension on the steel wire 53. One side of the winding on the electromagnet 51 is connected to a deflecting plate 41 of a second pair of deflection plates in the cathode ray tube 40, the other plate 41' being connected to ground. The other end of the winding of the electromagnet 51 is connected to ground by a conductor 56.

The surface unit 30 also includes energizing source 60 for the cathode ray tube and source 70 for the frequency determining member 50, but these sources are only shown in block form in order to avoid unnecessarily complicating the drawing.

In operation, the button 31 is depressed to urge the movable arm 33 of the switch 35 into contact with the fixed contact 37 thereof. This connects the direct current source 38 to the conductor B in the surface unit and from there to the rising pipe 4 of the sub-surface unit shown in Fig. 1. In the sub-surface unit the direct current potential is applied to one terminal of the winding of the electromagnet 3, the other terminal of the winding being grounded. This energizes the electromagnet 3 and causes the steel wire 2 to be attracted to the energized electromagnet.

When pressure is removed from the button 31, the movable arm 33 of the switch 35 returns to its normally biased position to make contact with the fixed contact 36 and break contact with the fixed contact 37. This removes the energizing potential from the electromagnet 3, permitting the steel wire 2 to be released from its deflected position. The steel wire 2 now vibrates at a frequency depending upon the amount it is tensioned by the pressure in the bore hole. Since the steel wire has just been under the influence of the magnetic flux set up by the electromagnet 3, the steel wire 2, being made of a magnetic material, is magnetized and sets up its own flux distribution. In addition, the de-energized electromagnet 3 still retains some residual flux.

The steel wire 2 vibrating at the above mentioned frequency causes the magnetic flux emanating therefrom to cut the winding mounted on the de-energized electromagnet 3. In addition, the magnetic flux set up by the magnetic steel wire interacts with the residual flux in the de-energized electromagnet. The result is an alternating current produced in the winding of the de-energized magnet, which current alternates at a frequency corresponding to the mechanical frequency to which the steel wire 2 is vibrating.

The current so induced in the winding of the deenergized electromagnet 3 is applied to the rising pipe 4 and conductor B through the switch 35 and the fixed contact 36 to the deflecting plate 39 of the cathode ray tube 40. This causes a deflection of the electron beam in the cathode ray tube, which deflection may be compared to the deflection made by the oscillator in the frequency determining member 50 of the surface unit. This frequency is applied to the plate 41 of the cathode ray tube 40. Accordingly, the calibrated member 54 is varied until the Lissajous figure on the cathode ray tube 40 indicates that the frequency of the vibrating steel wire 2 corresponds to the frequency set on the calibrated dial 54. At this moment, the frequency of the vibrating steel wire 2 is completely determined and the pressure in the bore hole is known. It is clear that the calibrated dial 54 may be calibrated directly in terms of pressure in the bore hole.

When employed to measure temperature in a well, as illustrated in Figure 2, the measuring element to be introduced into the well consists of a measuring member 12 consisting of a material whose coefficient of heat expansion differs from that of steel. A steel wire 13 is so stretched in or on the measuring member as to be capable of oscillation, a magnet 14 being arranged in front thereof to excite and convert the oscillations. In this arrangement, temperature variations act, to an extent determined by the relative coefficients of heat expansion of the measuring member and of the wire, to vary the tension of the wire and therefore the natural frequency of oscillation of the wire. This frequency of oscillation is determined in the manner already described, its square being proportional to the temperature to be measured.

The measuring member and the steel wire have different coefficients of heat expansion, so that each temperature variation produces a variation of the mechanical tension of the steel wire and consequently of its natural frequency. This momentary natural frequency of oscillation is measured and is a measurement of the temperature to be determined.

In accordance with the invention, the two elements for measuring the temperature and the pressure may be included together in a single unit of apparatus. One coil end of the magnets 3 and 14 is then simultaneously connected to the contact springs 5, while the other coil end of the magnets is connected to the rising pipe and/or the link system of the pump through a relay fitted in the arrangement, so that the pressure and temperature measurements may be made successively. The relay is continuously electrically connected to the contact springs 5 and to the rising pipe and/or the link system of the pump. The relay is changed over for pressure or temperature measurement by reversal of the polarity thereof or by varying the form of electric energising impulses, which are also transmitted through the outer casing and/or underground pipe line on the one hand and the rising pipe and/or link system of the pump on the other hand from the surface into the well and thus to the relay.

We claim:

1. Apparatus for measuring temperature in a bore-hole which comprises a member having a coefficient of heat expansion different from steel, a steel wire tensioned in said member and adapted to be varied in tension by variation in the expansion of said member, an electromagnet located close to said wire and adapted to excite the said wire to oscillate at its natural frequency as determined by its tension and to convert the oscillations into electrical oscillations, means for transmitting said electrical oscillations to the surface of the bore-hole and means for measuring the frequency of such oscillations.

2. Apparatus for measuring temperature in a bore-hole which comprises a member having a coefficient of heat expansion different from steel, a steel wire tensioned in said member and adapted to be varied in tension by variation in the expansion of said member, an electromagnet located close to said wire and adapted to excite the said wire to oscillate at its natural frequency as determined by its tension and to convert the oscillations into electrical oscillations, electrical connecting means between the coil of such electromagnet and a receiving instrument located at the surface of the bore-hole, and means included within said receiving instrument for determining the frequency of the electrical oscillations received by the instrument via said connecting means.

3. Apparatus for measuring temperature in a bore-hole which comprises a member having a coefficient of heat expansion different from steel, a steel wire tensioned in said member and adapted to be varied in tension by variation in the expansion of said member, an electromagnet located close to said wire and adapted to excite the said wire to oscillate at its natural frequency as determined by its tension and to convert the oscillations into electrical oscillations, electrical connecting means between the coil of such electromagnet and a receiving instrument located at the surface of the bore-hole and means included within said receiving instrument for determining the frequency of the electrical oscillations received by the instrument via said connecting means, the said electrical connecting means being effected via the rising pipe system of a pump sunk in the bore-hole as one conductor and the outer casing of the said pump as the second conductor, the said pipe system and outer casing being insulated from one another.

4. Apparatus for measuring pressure in a bore-hole having an electrically conductive outer casing therein comprising, in combination, an electrically conductive outer housing arranged within the outer casing and having a plurality of passageways in the surface thereof connecting the interior of the casing with the interior of said outer housing; an electrically conductive member fixedly mounted on said outer housing and making electrical sliding contact with said casing; an inner housing arranged in said outer housing and electrically insulated therefrom; a flexible diaphragm arranged in said inner housing and adapted to be moved by variations in said pressure; a tensioned steel wire in said inner housing and fixedly secured at one end thereof to said inner housing and connected to said diaphragm at the other end thereof, said tensioned steel wire being adapted to be varied in tension by movement of said diaphragm; an electromagnet having a winding arranged in said inner housing and located close to said wire and adapted to alternately excite said wire to mechanically oscillate at its natural frequency as determined by its tension and when unenergized to convert the mechanical oscillations into electrical oscillations; conduit means connected to said winding for supplying energizing current from a point external of the bore-hole to said winding and for transmitting the electrical oscillations induced in said winding to the surface of the bore-hole; and means connected to said conduit means for measuring the frequency of such oscillations.

5. Apparatus for measuring pressure in a bore-hole having an electrically conductive outer casing therein, comprising, in combination, an electrically conductive outer housing arranged within the outer casing and having a plurality of passageways in the surface thereof connecting the interior of the casing with the interior of said outer housing; an electrically conductive member fixedly mounted on said outer housing and making electrical sliding contact with said casing; an inner housing arranged in said outer housing and electrically insulated therefrom; a flexible diaphragm arranged in said inner housing and adapted to be moved by variations in said pressure; a tensioned steel wire in said inner housing and fixedly secured at one end thereof to said inner housing and connected to said diaphragm at the other end thereof, said tensioned steel wire being adapted to be varied in tension by movement of said diaphragm; an electromagnet having a winding arranged in said inner housing and located close to said wire and adapted to excite said wire to mechanically oscillate at its natural frequency as determined by its tension and when unenergized to convert the mechanical oscillations into electrical oscillations; electrical conduit means connected to said winding for supplying energizing current from a point external of the bore-hole to said winding and for transmitting the electrical oscillations induced in said winding to the surface of the bore-hole, said electrical conduit connecting means insulatingly supporting said housing; and a surface unit located at the surface of the bore-hole, said surface unit being connected to said conduit means and including means for determining the frequency of the electrical oscillations received by the instrument through said electrical conduit connecting means.

6. Apparatus for measuring a variable condition in a bore-hole having an electrically conductive outer casing therein, comprising, in combination, an electrically conductive outer housing arranged within the outer casing and having a plurality of passageways in the surface thereof connecting the interior of the casing with the interior of said outer housing; an electrically conductive member fixedly mounted on said outer housing and making electrical sliding contact with said casing; an inner housing arranged in said outer housing and electrically insulated therefrom; an element arranged in said inner housing and adapted to be moved by variations in said variable condition; a tensioned steel wire in said inner housing and fixedly secured at one end thereof to said inner housing and connected to said element at the other end thereof, said tensioned steel wire being adapted to be varied in tension by movement of said element; an electromagnet having a winding arranged in said inner housing and located close to said wire and adapted to alternately excite said wire to mechanically oscillate at its natural frequency as determined by its tension and when unenergized to convert the mechanical oscillations into electrical oscillations; conduit means connected to said winding for supplying energizing current from a point external of the bore-hole to said winding and for transmitting the electrical oscillations induced in said winding to the surface of the bore-hole; and means connected to said conduit means for measuring the frequency of such oscillations.

7. Apparatus for measuring a variable condition in a bore-hole having an electrically conductive outer casing therein, comprising, in combination, an electrically conductive outer housing arranged within the outer casing and having a plurality of passageways in the surface thereof connecting the interior of the casing with the interior of said outer housing; an electrically conductive member fixedly mounted on said outer housing and making electrical sliding contact with said casing; an inner housing arranged in said outer housing and electrically insulated therefrom; an element arranged in said inner housing and adapted to be moved by variations in said variable condition; a tensioned steel wire in said inner housing and fixedly secured at one end thereof to said inner housing and connected to said element at the other end thereof, said tensioned steel wire being adapted to be varied in tension by movement of said element; an electromagnet having a winding arranged in said inner housing and located close to said wire and adapted to excite said wire to mechanically oscillate at its natural frequency as determined by its tension and when unenergized to convert the mechanical oscillations into electrical oscillations; electrical conduit means connected to said winding for supplying energizing current from a point external of the bore-hole to said winding and for transmitting the electrical oscillations induced in said winding to the surface of the bore-hole, said electrical conduit connecting means insulatingly supporting said housing; and a surface unit located at the surface of the bore-hole, said surface unit being connected to said conduit means and including means for determining the frequency of the electrical oscillations received by the instrument through said electrical conduit connecting means.

References Cited in the file of this patent

UNITED STATES PATENTS

| Number | Name | Date |
|---|---|---|
| 1,991,658 | Clark et al. | Feb. 19, 1935 |
| 2,190,260 | Ennis | Feb. 13, 1940 |
| 2,306,137 | Pabst et al. | Dec. 22, 1942 |
| 2,380,520 | Hassler | July 31, 1945 |
| 2,447,816 | Rieber | Aug. 24, 1948 |
| 2,447,817 | Rieber | Aug. 24, 1948 |
| 2,466,809 | Hobbs | Apr. 12, 1949 |
| 2,604,787 | Coyne et al. | July 29, 1952 |
| 2,646,680 | Steele et al. | July 28, 1953 |